3,426,034
ω-PHENYL-ω-PYRIDYL ALKYLAMINE DERIVATIVES

Kurt Thiele, Frankfurt am Main, and Klaus Posselt, Bergen-Enkheim, Germany, assignors to Deutsche Gold- und Silber-Scheideanstalt vormals Roessler, Frankfurt am Main, Germany
No Drawing. Continuation-in-part of application Ser. No. 328,119, Dec. 4, 1963. This application Mar. 24, 1966, Ser. No. 536,964
U.S. Cl. 260—296                6 Claims
Int. Cl. C07d 31/42

ABSTRACT OF THE DISCLOSURE

Compounds of the formula

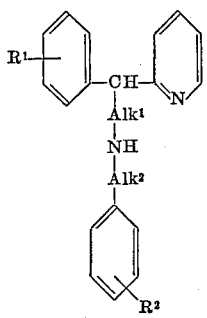

wherein each of Alk$^1$ and Alk$^2$ are alkylene of 2 to 4 carbon atoms, the total carbon atoms of Alk$^1$ and Alk$^2$ being at least 6, and each of R$^1$ and R$^2$ are selected from the group consisting of hydrogen, chlorine, hydroxy, lower alkoxy and lower alkyl which are active as coronary vasodilators and have positive inotropic activity.

---

This is a continuation-in-part of application Ser. No. 328,119, filed Dec. 4, 1963, now abanoned.

The present invention relates to novel ω-phenyl-ω-pyridyl alkylamine derivatives of the following formula:

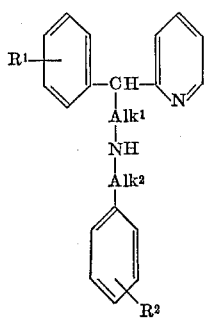

in which each of Alk$^1$ and Alk$^2$ are straight or branch chained alkylene of 2 to 4 carbon atoms, the total carbon atoms of Alk$^1$ and Alk$^2$ being at least 6, and each of R$^1$ and R$^2$ are hydrogen, chlorine, hydroxy, lower alkoxy, such as methoxy, or lower alkyl, such as methyl, and their acid addition salts with acids having pharmaceutically acceptable anions. The novel compounds according to the invention simultaneously have a good activity as coronary vasodilators and a good positive inotropic activity (increase in amplitude of heart contractions).

The novel compounds according to the invention can be prepared by a number of conventional reactions used in the synthesis of organic compounds as can be seen from the following illustrative examples.

Example 1

N-3-[phenyl-propyl-(2)]-4 - phenyl - 4 - pyridyl-(2)-butyl-(1)-amine

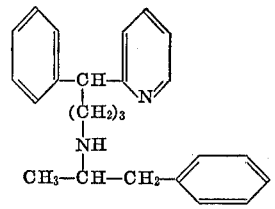

33.8 g. of 2-benzylpyridine were dissolved in 50 cc. of benzene and 15.6 g. of a 50% NaNH$_2$ benzene suspension added thereto and the mixture refluxed for 2 hours. Then 63 g. of N-(3-bromo-propyl)-3-phenyl-propyl-(2)-amine in 100 cc. of benzene were added dropwise. The mixture was boiled under reflux for 4 hours. After completion of the reaction the reaction mixture was cooled and water added thereto. The benzene layer was separated off and the aqueous layer extracted again with benzene. The combined benzene solutions were concentrated and the residue fractionated. The free base distilled over at 215–217° C. at 0.8 torr (1 torr=the pressure of a column of Hg 1 mm. high). The base when reacted with 1 mol of maleic acid produced a crystalline salt which after recrystallization from isopropanol had a melting point of 127–128° C.

Example 2

N-[3-p-Cl-phenyl - 2 - methyl-propyl-(2)]-3-phenyl-3-[pyridyl-(2)]-propyl-(1)-amine

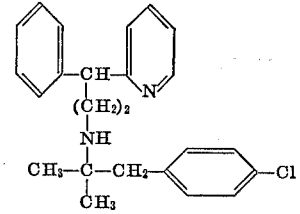

33.8 g. of 2-benzylpyridine were first treated with NaNH$_2$ as described in Example 1 and then reacted with 73 g. of 3-(p-Cl-phenyl)-2-methyl-2-(ω-Br-ethylamino)-propane and the reaction mixture processed as in Example 1. The base produced boiled at 210–223° C. at 0.3 torr. The maleic acid salt thereof, prepared and recrystallized as in Example 1, had a melting point of 137–138° C.

Example 3

N-[4-phenyl-butyl-(2)] - 3 - phenyl-3-[pyridyl-(2)]-propyl-(1)-amine

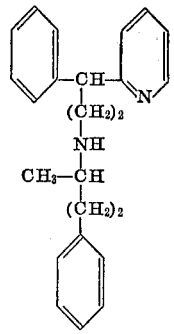

was prepared by a process analogous to that described in Example 1. The free base boiled at 210–212° C. at 0.4 torr. A crystalline salt was prepared with ½ mol of fumaric acid which after recrystallization from isopropanol had a melting point of 157–158° C.

Example 4

N - [3 - (p - chlorophenyl)-2-methyl-propyl-(2)]-{4-phenyl-4-[pyridyl-(2)]-butyl-(1)}-amine

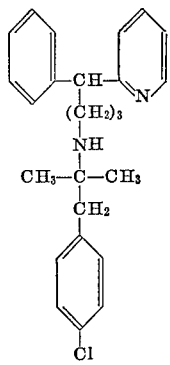

17 g. of benzylpyridine were first reacted with 7.8 g. of a 50% NaNH₂ suspension in toluene and then reacted with 34.4 g. of N - [3 - bromo-propyl-(1)]-[3-(p-chlorophenyl)-2-methyl-propyl-(2)]-amine in toluene while refluxing. The reaction mixture was processed as described above. The base boiled at 216–220° C. at 0.2 torr. A crystalline salt was obtained with 1 mol of maleic acid which after recrystallization from isopropanol had a melting point of 129–130° C.

Example 5

N - [4 - phenyl - butyl - (2)]-4-phenyl-4-pyridyl-(2)-butyl-(1)-amine

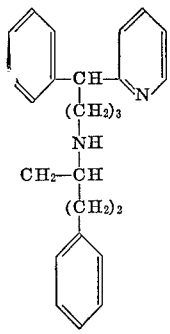

was prepared as described in Example 1 from 33.6 g. of benzylpyridine, 7.8 g. NaNH₂ and 35.1 g. of N-[3-bromo-propyl-(1)]-[4-phenyl-butyl-(2)]-amine. Its boiling point was 207–212° C. at 0.1 torr. The crystalline maleic acid salt thereof produced with 1 mol maleic acid after recrystallization from isopropanol had a melting point of 129–130° C.

Example 6

N - [3 - p - chlorophenyl - 2 - methyl - propyl - (2)] - 3-phenyl-3-[pyridyl-(2)]-propyl-(1)-amine

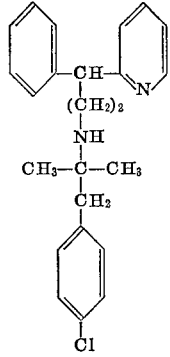

40 g. (0.19 mol) of β-phenyl-β-pyridyl-(2)-propionaldehyde together with 35 g. (0.19 mol) of 1-p-chlorophenyl-2-methyl-2-amino-propane in 500 cc. of absolute alcohol were refluxed for 1 hour. After cooling the Schiff base produced was reduced with 5 g. of sodium borohydride dissolved in 50 cc. of ethanol. Thereafter water was added to the reaction mixture and the alcohol and water distilled off. The residue was taken up in ether and dried with potash and the ether distilled off. The residue was fractionated. Tht base distilled over at 175–190° C. at 0.05 torr. The crystalline salt obtained with 1 mol of maleic acid after recrystallization from isopropanol had a melting point of 137–138° C.

Example 7

N - [3 - (p - chlorophenyl) - propyl - (2)] - {4 - phenyl-4-[pyridyl-(2)]-butyl-(1)}-amine

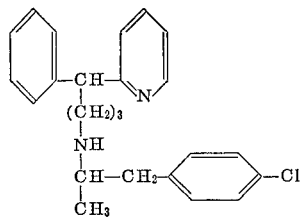

22.6 g. of γ-phenyl-γ-pyridyl-(2)-butyraldehyde and 17.0 g. of 1-(p-chlorophenyl)-propyl-(2)-amine were refluxed on a water bath for one hour in 200 ml. of ethanol. After cooling the Schiff base produced was reduced with 2 g. of sodium borohydride dissolved in 50 cc. of ethanol. Thereafter water was added to the reaction mixture and the alcohol and water distilled off. The residue was taken up in ether and dried with potash and the ether distilled off. The residue was fractionated. The base distilled over at 170–200° C. at 0.05 torr. The crystalline salt obtained with 1 mol. of maleic acid after recrystallization from ethyl acetate had a melting point of 142° C.

Example 8

N - [3 - (4-hydroxy-phenyl)-propyl-(2)]-{4-phenyl-4-[pyridyl-(2)]-butyl-(1)}-amine

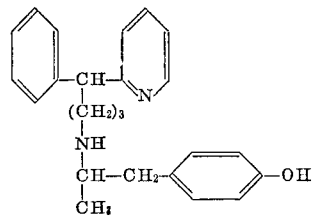

37.5 g. of γ-phenyl-γ-pyridyl-(2)-butyraldehyde and 40 g. of p-benzyloxyphenyl-propyl-(2)amine were refluxed on a water bath for one hour in 200 ml. of ethanol. After cooling the Schiff base produced was reduced with 6.5 g. of sodium borohydride dissolved in 50 cc. of ethanol. Thereafter water was added to the reaction mixture to precipitate the base which was then debenzylated, without purification, with hydrogen in the presence of 8 g. of palladium carbon (10%) in 300 ml. of 90% ethanol. The catalyst was then filtered off, the solvent distilled off and the residue dissolved in ether. This solution was neutralized with citric acid. 37 grams of the citrate were obtained which after recrystallization from isopropanol had a melting point of 75° C.

We claim:
1. A compound of the formula

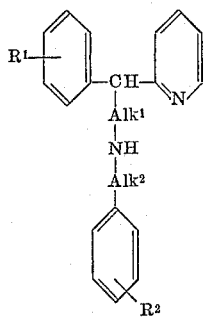

wherein each of Alk¹ and Alk² are alkylene of 2 to 4 carbon atoms, the total carbon atoms of Alk¹ and Alk² being at least 6, and each of R¹ and R² are selected from the group consisting of hydrogen, chloride, hydroxy, lower alkoxy and lower alkyl.

2. A compound as claimed in claim 1 of the formula

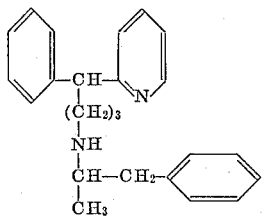

3. A compound as claimed in claim 1 of the formula

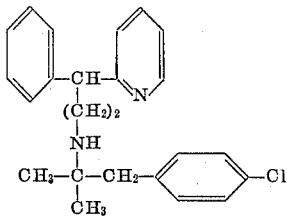

4. A compound as claimed in claim 1 of the formula

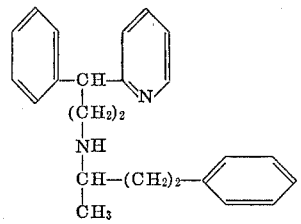

5. A compound as claimed in claim 1 of the formula

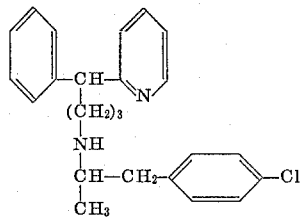

6. A compound as claimed in claim 1 of the formula

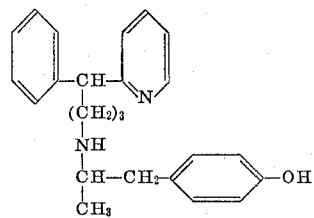

References Cited

UNITED STATES PATENTS 3,042,680   7/1962   Thiele _____ 260—296

OTHER REFERENCES

Burger, Medicinal Chemistry, 2nd Ed., Interscience, New York, 1960; p. 78.

HENRY R. JILES, *Primary Examiner.*

A. L. ROTMAN, *Assistant Examiner.*

U.S. Cl. X.R.

260—999